April 1, 1969  W. JUNKERMANN  3,435,890
HEAT EXCHANGER
Filed April 22, 1966
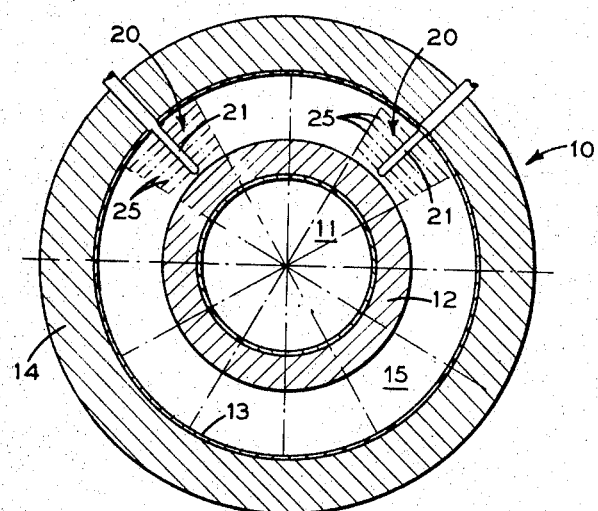
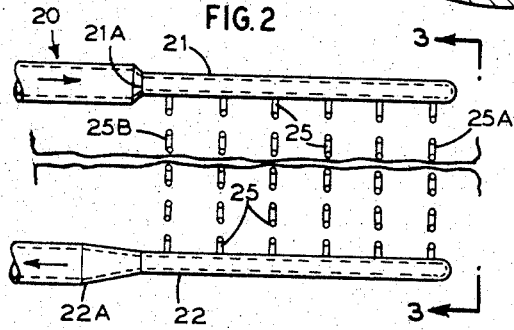
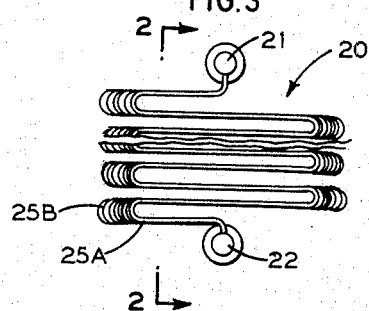
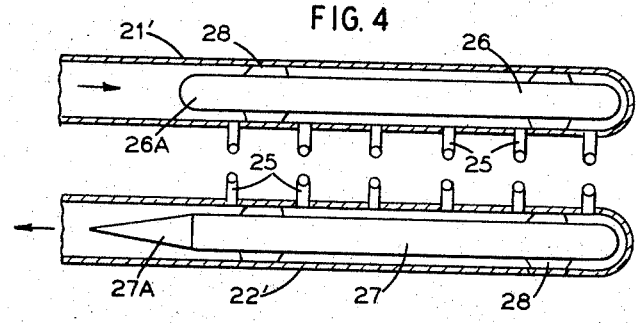
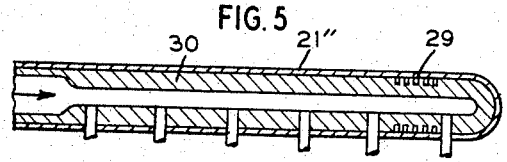
INVENTOR.
Wolfgang Junkermann
BY
ATTORNEY

United States Patent Office 3,435,890
Patented Apr. 1, 1969

3,435,890
HEAT EXCHANGER
Wolfgang Junkermann, Oberhausen, Rhineland, Germany, assignor to Babcock & Wilcox Limited, London, England, a company of Great Britain
Filed Apr. 22, 1966, Ser. No. 544,491
Int. Cl. F28f 9/22
U.S. Cl. 165—145    9 Claims This invention relates generally to tubular heat exchangers, and more particularly to the heat exchanger arrangement for disposition in an annular space such as may be found in an integral boiler nuclear reactor.

The majority of heat exchangers for use in an annular space are arranged with radially positioned heat exchange elements or tubes. In this known arrangement, the clearance between tubes at the outer periphery of the annular space is greater than the corresponding clearance at the inner periphery, which results in an inefficient use of the annular space and/or a decrease in the overall heat transfer efficiency of the heat exchanger. Moreover, known designs wherein attempts have been made to provide even spacing between tubes in order to improve the overall heat transfer efficiency have proven to be very difficult to fabricate and correspondingly expensive. In many of these designs, the entire heat exchanger is constructed as an integral unit so that in the event of a single tube failure, the entire heat exchanger must be taken out of service immediately and must be removed for purposes of repair.

It is therefore an object of the present invention to provide a heat exchanger arrangement that is compact so as to efficiently utilize completely the available space of an annular passage, thereby insuring efficient heat transfer and minimizing the size of the containment vessel required to house the heat exchanger. It is a further object that the flow of fluid through the elements of the heat exchanger be apportioned so that each element has flowing therethrough a quantity of fluid proportionate to its length. A still further object of the present invention is that the heat exchanger include a multiplicity of separate, independent sections or bundles, each of which may be separately taken out of service and then removed from the annular passage.

These objects are attained according to the present invention, in a heat exchanger arranged for disposition in an annular fluid flow passage of the type generally found in an integral boiler nuclear reactor wherein the annular flow passage surrounds the nuclear core. The heat exchanger includes a plurality of separate tubular heat exchange sections disposed in the annular passage, the individual sections being arranged so as to substantially fill a sector-shaped portion of the passage. Each section includes inlet and outlet headers respectively disposed at the top and bottom of the section and extending radially through the passage. A plurality of multi-looped tubular heat exchange elements are connected between the headers and are arranged in equally spaced parallel planes perpendicular to the radial direction in which the headers are oriented. Each element in the heat exchange section is wider than the inwardly adjacent element to an extent determined by the distance between the elements, so that the outer extremities of the elements are aligned in intersecting radial planes to provide the desired space filling sector-shaped section. Means are provided for apportioning the flow of fluid through the heat exchange elements in general proportion to the length of the elements. This apportioning means preferably includes an abrupt decrease in the flow area of the inlet header upstream of the connection of heat exchange elements to the header, and a relatively gradual increase in flow area in the outlet header downstream of the connection of the heat exchange elements. The abrupt decrease and relatively gradual increase may be conveniently effected by centrally disposed shaped inserts supported within the inlet and outlet headers, or by erosion resistant shaped liners sealed against the inner walls of the headers.

For a better understanding of the invention, its operating advantages and specific objects attained by its use, reference should be had to the following decription which refers to the accompanying drawings in which FIG. 1 is a schematic sectional plan view of an integral boiler nuclear reactor employing the heat exchanger according to the present invention; FIG. 2 is an enlarged elevation of a heat exchange section of the heat exchanger shown in FIG. 1 and taken along line 2—2 of FIG. 3; FIG. 3 is a view taken along line 3—3 of FIG. 2; FIG. 4 is a longitudinal sectional view of an alternate embodiment of a header construction which may be used in the heat exchanger section shown in FIG. 2; and FIG. 5 is another alternate embodiment of a header construction.

Referring to FIG. 1 of the drawings, the integral boiler-nuclear reactor 10 includes a centrally located reactor core 11 surrounded by a cylindrical shaped shroud or reflector 12, which forms the inner boundary of an annular passage 15. The passage 15 is bounded on its outer periphery by a cylindrical steel liner 13 which is enclosed and reinforced by a concrete containment wall 14, the liner 13 and the wall 14 compositely comprising the reactor containment vessel. It should be understood that in the general type of reactor involved, a fluid is heated in passing through the reactor core 11 and is then circulated (preferably upwardly) through the annular passage 15.

Disposed within the passage 15 is a heat exchanger which includes a plurality (two of twelve are shown in FIG. 1) of generally sector-shaped heat exchange sections 20 arranged circumferentially in side-by-side relation. Referring additionally to FIGS. 2 and 3, each section 20 includes an inlet header 21 and an outlet header 22, which headers extend through the passage 15 in a radial direction and are disposed in a common vertical plane respectively at the top and bottom of the section 20. Connected between the headers are a plurality of multi-looped tubular heat exchange elements 25 arranged in equally spaced parallel planes perpendicular to the radial orientation of the headers 21 and 22. It should be noted that the outermost element 25B is wider than the innermost element 25A, and that the outer extremities of the intermediate elements 25 become progressively wider toward the outer periphery of the passage 15, so that the lateral extremities of all of the elements 25 are aligned in a pair of intersecting radial planes so as to form the necessary space-filling sector-shaped horizontal cross-section of the heat exchange section 20. The headers 21 and 22 are closed at their inner ends, and are suitably connected at their outer ends to appropriate piping (not shown) through which cooling fluid may be supplied to and taken away from the section 20 after flowing through the elements 25.

It shodld be recognized that the above-described arrangement of the heat exchange sections 20 substantially fills the passage 15 with equally spaced heat exchange elements. This compact arrangement permits the optimal utilization of all heat exchange surface so that, for a given total rate of heat transfer, the size of the annular passage 15 is minimized, thereby resulting in a containment vessel of the smallest possible diameter. It should further be recognized that the heat exchange sections 20 are not interconnected with adjacent sections so that any section 20 could be removed from the annular passage 15 without disturbing any of the other sections; moreover, by appropriate valving (not shown) an individual section 20 could be taken out of service while the remaining sections continue operating.

Because of the difference in the developed lengths of the tubular elements 25, the rate of flow of fluid through the elements 25 is advantageously apportioned in relation to the element lengths in order that the heat absorption for all of the elements 25 will be proportional to their lengths. Thus, the flow through the element 25B will be greater than the flow through the element 25A by a factor equal to the ratio of the developed lengths of the elements 25B and 25A, the rate of heat absorption per unit of absorbing area being the same for both elements.

To accomplish the desired apportioning of fluid among the tubular elements 25 of each section 20, the inlet header 21 is formed with an abrupt decrease (at 21A) in fluid flow area upstream of the connection of the tubes 25 with the header 21, while the outlet header 22 is formed with a relatively gradual increase (at 22A) in fluid flow area downstream of the connection of the tubes 25 of the header 22.

Because of the difference in developed length of each of the heat exchange elements 25, the flow of the fluid through the individual elements has to be adjusted in accordance with the total heat absorption by the respective elements in order to provide a uniform quality of fluid leaving each element. This flow apportioning is accomplished by the design of the inlet header 21 and outlet header 22, in that the inlet end of the header includes an abrupt contraction of flow area while the outlet end of header 22 is formed with a relatively gradual transition from a small to a larger flow area. The abrupt change in flow area of the inlet produces relatively high friction loss throughout the constricted remaining length of the header 21. Thus the total available energy components of the fluid entering the inlet header 21 undergo a decisive change with the static head being drastically reduced due to the contraction of flow section and then by the conversion of static head to velocity head because of the smaller flow area of the constricted portion of header 21. Moreover, the reduced flow area of the header 21 imposes a relatively high friction loss due to axial flow within the header. These effects all advantageously combine to provide the desired distribution of fluid to each of the individual heat exhcange elements, with the axial flow friction effect, in particular, providing the requisite incremental resistance between adjacent elements to properly apportion the flow to the multiple parallel flow paths defined by the exchanged elements 25 of the heat exchange section 20.

In the constricted portion of the outlet header 22, the axial velocity within the header is increasing as the flow of each succeeding element enters the header. Thus the axial friction due to flow within the header 22 is successively augmented as flow proceeds toward the outlet to complement the effect of the constricted inlet header 21. The gradually increasing flow area of the outlet header 22 at its downstream end, allows maximum pressure recovery.

Thus, by judiciously sizing the header flow areas, the incremental friction drops occasioned by axial flow can be made to effectively apportion the flow to the heat exchange elements such that those of greater exposed length will be receiving proportionately more of the total flow since the longer elements are closer to the inlet and outlet connections to the headers and thus are not subject to the flow restraining influence of the axial friction and, as a consequence, there is more head available to overcome the additional friction due to the increased flow in the tubes of greater heat absorbing length. Referring to FIG. 2, this means that element 25B will have more head available for overcoming friction due to flow than will element 25A, for example.

In the sizing of header flow areas in order to obtain the desired flow rates with substantially the same pressure drops in the flow paths of elements 25A and 25B, it should be noted that the pressure drops will vary as the first power of the developed length (which is directly proportional to width) of the individual elements. However, since element 25B, due to its greater amount of exposed surface, absorbs more heat than element 25A, the amount of flow in element 25B must be increased in proportion to the ratio of the lengths of exposed heat absorbing surface of elements 25A and 25B, and the resultant friction due to fluid flow will then be proportional to the square of this ratio. Hence the pressure drops in elements 25B and 25A will be proportioned in the ratio of the lengths of 25B and 25A to the third power, taking into consideration both the variation in length of elements and the consequent variation in heat absorption. Such proportioning can be readily accomplished by the abovedescribed judicious sizing of the inlet and outlet headers alone, since these components have the predominant effect on pressure drop in the elements 25.

If, for structural design reasons, a reduction in outside header diameter is not desirable, the necessary fluid flow apportionment may be accomplished by the use of header inserts. Referring to FIG. 4, the inlet header 21' may be fitted internally with a centrally located displacement piece 26 having a blunt end 26A facing upstream to effect a change in fluid flow area and resultant pressure drop similar to that resulting from the abrupt decrease in diameter of the inlet header 21 shown in FIG. 2. The outlet header 22' may likewise be fitted with a centrally located displacement piece 27 having a gradually tapering end 27A facing downstream to effect the aforementioned gradual increase in flow area. The displacement pieces 26 and 27 may be suitably positioned within the headers 21' and 22' by means of outwardly extending support legs 28.

In the alternate embodiment of FIG. 5, the inlet header 21" may be provided with an internal liner 30 having an internal contour suitable for providing the necessary change in flow area. A labyrinth type seal 29 may be provided in the liner 30 to preclude any substantial flow of fluid between the liner and the inner wall of the header 21". The arrangement of FIG. 5 is particularly useful wherein friction losses to be created by the reduced header diameter are great and where the fluid flowing through the header is of an extremely erosive and/or corrosive nature since, in that event the liner 30 could be made to be replaceable.

What is claimed is:

1. In a heat exchanger arranged for disposition within an annular fluid flow passage and comprising a plurality of tubular heat exchange sections disposed in said passage, each of which substantially fills a sector-shaped portion of said annular passage and includes an inlet header extending through said passage in a direction radial thereto, a plurality of multi-looped tubular heat exchange elements connnected with said header and arranged in equally spaced parallel planes perpendicular to said radial direction, each element being wider than the element inwardly adjacent thereto to an extent determined by the distance between the elements, whereby the outer extremities of the elements are aligned in intersecting planes so as to form a sector-shaped heat exchanger section.

2. A heat exchanger according to claim 1 wherein said fluid flow passage is bounded by inner and outer upright cylindrical walls, and said inner wall houses a nuclear reactor core.

3. A heat exchanger according to claim 2 wherein each of said heat exchange sections further includes an outlet header connected with said heat exchange elements and extending through said passage in a direction radial thereto.

4. A heat exchanger according to claim 3 wherein said inlet and outlet headers are disposed in a common vertical plane, and said inlet and outlet headers are respectively arranged at the top and bottom of the heat exchange section of which they form a part.

5. A heat exchanger according to claim 3 wherein means are provided for apportioning the flow of fluid through said heat exchange elements in proportion to the length of said heat exchange elements.

6. A heat exchanger according to claim 5 wherein the apportioning means is disposed within the headers.

7. A heat exchanger according to claim 6 wherein the apportioning means includes means forming an abrupt decrease in the flow area of the inlet header upstream of the connection of heat exchange elements to the inlet header, and means forming a relatively gradual increase in flow area in the outlet header downstream of the connection of the heat exchange elements to the outlet header.

8. A heat exchanger according to claim 7 wherein centrally disposed shaped inserts are supported within the inlet and outlet headers for effecting the abrupt decrease and relatively gradual increase.

9. A heat exchanger according to claim 7 wherein erosion resistant shaped liners are sealed against the inner walls of the inlet and outlet headers for effecting the abrupt decrease and relatively gradual increase.

References Cited

UNITED STATES PATENTS

| | | | |
|---|---|---|---|
| 2,729,433 | 1/1956 | Berg | 165—145 |
| 3,310,104 | 3/1967 | Tillequin | 165—145 |

ROBERT A. O'LEARY, *Primary Examiner.*

C. SUKALO, *Assistant Examiner.*